United States Patent [19]

Jensen

[11] Patent Number: 5,179,681
[45] Date of Patent: Jan. 12, 1993

[54] METHOD AND APPARATUS FOR CURRENT WINDOW CACHE WITH SWITCHABLE ADDRESS AND OUT CACHE REGISTERS

[75] Inventor: Eric H. Jensen, Livermore, Calif.

[73] Assignee: Sun Microsystems, Inc., Mountain View, Calif.

[21] Appl. No.: 437,978

[22] Filed: Nov. 16, 1989

[51] Int. Cl.⁵ .............................................. G06F 12/06
[52] U.S. Cl. ............................. 395/425; 364/DIG. 1
[58] Field of Search ... 364/200 MS File, 900 MS File; 395/425, 400 MS, 425 MS

[56] References Cited

U.S. PATENT DOCUMENTS

| | | | |
|---|---|---|---|
| 4,734,852 | 3/1988 | Johnson et al. | 364/200 |
| 4,811,208 | 3/1989 | Myers et al. | 364/200 |
| 4,891,753 | 1/1990 | Budde et al. | 364/200 |
| 4,947,366 | 8/1990 | Johnson | 364/900 |
| 5,083,263 | 1/1992 | Joy et al. | 395/425 |

FOREIGN PATENT DOCUMENTS 0149392 7/1985 European Pat. Off.
0241909 10/1987 European Pat. Off.

OTHER PUBLICATIONS

RISC Architecture, Tabak, Daniel, 1987, pp. 30-32, 47.

Primary Examiner—Joseph L. Dixon
Assistant Examiner—Reba I. Elmore
Attorney, Agent, or Firm—Blakely Sokoloff Taylor & Zafman

[57] ABSTRACT

A processor having a plurality of windowed registers comprising IN, OUT and local window registers, where the IN registers of each window are addressable as the OUT registers of a logically-adjacent succeeding window. The processor also having a cache of two sets of IN/OUT registers with switchable addresses and a set of local cache registers. The addresses of the first set of IN/OUT registers can be changed to the addresses of the second set of IN/OUT registers, and vice versa, when the current window changes during a save or restore operation.

14 Claims, 5 Drawing Sheets

| | | | | | |
|---|---|---|---|---|---|
| 0 | 0 | 0 | 0 | 0 | 0 |
| 0 | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| 0 | 0 | 1 | 1 | 0 | 6 |
| 0 | 0 | 1 | 1 | 1 | 7 |
| 0 | 1 | 0 | 0 | 0 | 8 |
| 0 | 1 | 0 | 0 | 1 | 9 |
| 0 | 1 | 0 | 1 | 0 | 10 |
| 0 | 1 | 0 | 1 | 1 | 11 |
| 0 | 1 | 1 | 0 | 0 | 12 |
| 0 | 1 | 1 | 0 | 1 | 13 |
| 0 | 1 | 1 | 1 | 0 | 14 |
| 0 | 1 | 1 | 1 | 1 | 15 |
| 1 | 0 | 0 | 0 | 0 | 16 |
| 1 | 0 | 0 | 0 | 1 | 17 |
| 1 | 0 | 0 | 1 | 0 | 18 |
| 1 | 0 | 0 | 1 | 1 | 19 |
| 1 | 0 | 1 | 0 | 0 | 20 |
| 1 | 0 | 1 | 0 | 1 | 21 |
| 1 | 0 | 1 | 1 | 0 | 22 |
| 1 | 0 | 1 | 1 | 1 | 23 |
| 1 | 1 | 0 | 0 | 0 | 24 |
| 1 | 1 | 0 | 0 | 1 | 25 |
| 1 | 1 | 0 | 1 | 0 | 26 |
| 1 | 1 | 0 | 1 | 1 | 27 |
| 1 | 1 | 1 | 0 | 0 | 28 |
| 1 | 1 | 1 | 0 | 1 | 29 |
| 1 | 1 | 1 | 1 | 0 | 30 |
| 1 | 1 | 1 | 1 | 1 | 31 |

*Figure 5*

METHOD AND APPARATUS FOR CURRENT WINDOW CACHE WITH SWITCHABLE ADDRESS AND OUT CACHE REGISTERS

BACKGROUND OF THE INVENTION

1. Field of the Invention

This invention relates to computer systems and, more particularly, to methods and apparatus for implementing processors used in reduced instruction set computers.

2. History of the Prior Art

The development of digital computers progressed through a series of stages beginning with processors which were able to process only a few basic instructions in which the programming needed to be done at a machine language level to processors capable of handling very complicated instructions written in high level languages. At least one of the reasons for this development is that high level languages are easier for programmers, and thus more programs are developed more rapidly. Another reason is that up to some point in the development, the more advanced machines executed operations more rapidly.

There came a point, however, where the constant increase in the ability of the computers to run more complicated instructions actually began to slow the operation of the computer over what investigators felt was possible with machines operating with only a small number of basic instructions. These investigators began to design advanced machines for running a limited number of instructions, a so-called reduced instruction set, and were able to demonstrate that these machines did, in fact, operate more rapidly for some types of operations. Thus began the reduced instruction set computer which has become known by its acronym, RISC.

One design of a RISC computer is based on the Scalable Process Architecture (SPARC) designed by Sun Microsystems, Inc., Mountain View, Calif., and implemented in the line of SPARC computers manufactured by that company. One salient feature of the SPARC computers is the design of the processors which include control/status registers and general purpose registers. The control/status registers in the processor of the integer unit, for example, include a processor state register, a window invalid mask, a trap base register, a multiply/divide register, program counters, among others.

The general registers include from forty to five hundred twenty 32 bit registers. Whatever the total number of general registers, these registers are partitioned into eight global registers and a number of sixteen registers sets, each set divided into eight IN and eight local registers. At any time, an instruction can access a window including the eight global registers, the IN and local registers of one set of registers, and the IN registers of a logically-adjacent set of registers. These IN registers of the logically-adjacent set of registers are addressed as the OUT registers of the sixteen register set of the window including both IN and local registers. Thus, an instruction can access a window including the eight global registers, the IN and local registers of one set of registers, and the IN registers addressed as OUT registers of the logically-adjacent set of registers.

This architecture provides a number of advantages not the least of which is that the processor may switch from register set to register set without having to save to memory and restore all of the information being handled by a particular register set before proceeding to the operation handled by the next register set. For example, since the IN registers of one register set are the same registers as the OUT registers of the preceding set of registers, the information in these registers may be utilized immediately by the next or previous sets of registers without the necessity of saving the information to memory and writing the information to the IN registers of the next set of registers. Moreover, the large number of register sets allows a great number of operations to be implemented simultaneously, in many cases without the need to save to memory and restore before proceeding with the operation in any particular register set. This offers great speed advantages over other forms of RISC architecture.

However, no matter how philosophically advanced the SPARC architecture, it requires implementation in hardware.

SUMMARY OF THE INVENTION

It is, therefore, an object of the present invention to provide an especially fast implementation of the SPARC processor architecture.

It is another more specific object of the present invention to provide a processor design which utilizes a fast cache as an implementation of the SPARC architecture.

These and other objects of the present invention are realized in a processor which comprises a plurality of sets of windowed registers, each set including a first plurality of IN registers and a second plurality of local registers, the IN registers of each set being addressable as the OUT registers of a logically-adjacent preceding set of registers, pointers for indicating which set of registers is being addressed, a set of global registers which may be addressed with each of the sets of registers, an arithmetic and logic unit, a cache memory comprising a number lines at least equal to the total of the number of registers in an addressable set of windowed registers including the set of global registers and the IN registers of logically-adjacent set of registers addressable as OUT registers for a set of registers, and circuitry for changing the addresses of lines of the cache holding information presently designated in a particular window register set as information held in OUT registers to addresses designating the IN registers of the next register set, and circuitry for allowing the arithmetic and logic unit to access selected lines of the cache memory as processor registers.

The preferred embodiment of the invention also comprises circuitry for changing the addresses of lines of the cache holding information presently designated in a particular window register set as information held in IN registers to addresses designating the OUT registers of the next register set when a restore operation is to occur.

These and other objects and features of the invention will be better understood by reference to the detailed description which follows taken together with the drawings in which like elements are referred to by like designations throughout the several views.

BRIEF DESCRIPTION OF THE DRAWINGS

FIG. 5 illustrates a series of binary numbers which may be used in addressing thirty-two registers.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
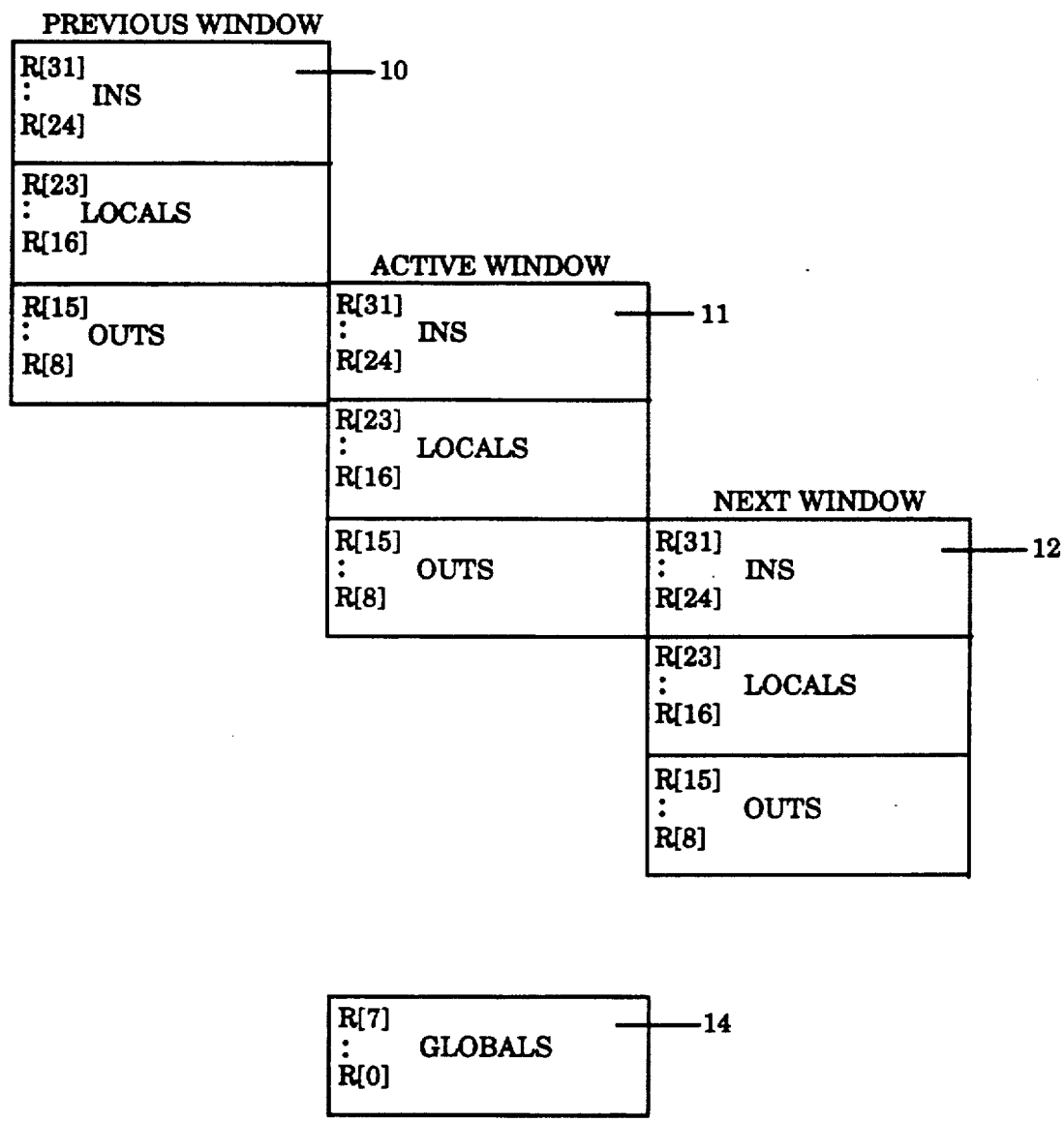
FIG. 1 is a block diagram illustrating three logically-adjacent sets of register windows in the SPARC architecture.

Referring now to FIG. 1 there is shown a diagram of a portion of the general registers of an integer processor used in a SPARC architecture RISC computer. Three register windows 10, 11, and 12 are shown together with the set of global registers 14 common to all of the register windows 10, 11, and 12. In the arrangement shown there are eight global registers r(0) through r(7) and three register sets of twenty-four registers each set designated r(8) through r(31). Each set of registers includes eight OUT registers r(8) through r(15), eight local registers r(16) through r(23), and eight IN registers r(24) through r(31). The particular register sets may be implemented in random access memory or in any of a number of other well known ways.

When the registers of a particular register window are utilized in an operation by the processor, information is transferred into the register window through the IN registers and results of the operation are placed in the OUT registers. The IN registers of each of the logically-adjacent register windows are the same physical registers as the OUT registers of the preceding register window. Consequently, when an operation in register window 10 places results in its OUT registers, those results are resident in the IN registers of register window 11 since the registers are physically the same. The use of a plurality of register windows allows operations which might normally require that the register values be stored in memory before a next operation could take place and restored to the registers when next required may be implemented by switching between a plurality of register windows without the need to store and restore results. The use of overlapping IN and OUT registers eliminates even the need to accomplish an actual write operation to accomplish the transfer between registers in many instances.

Figure 2:
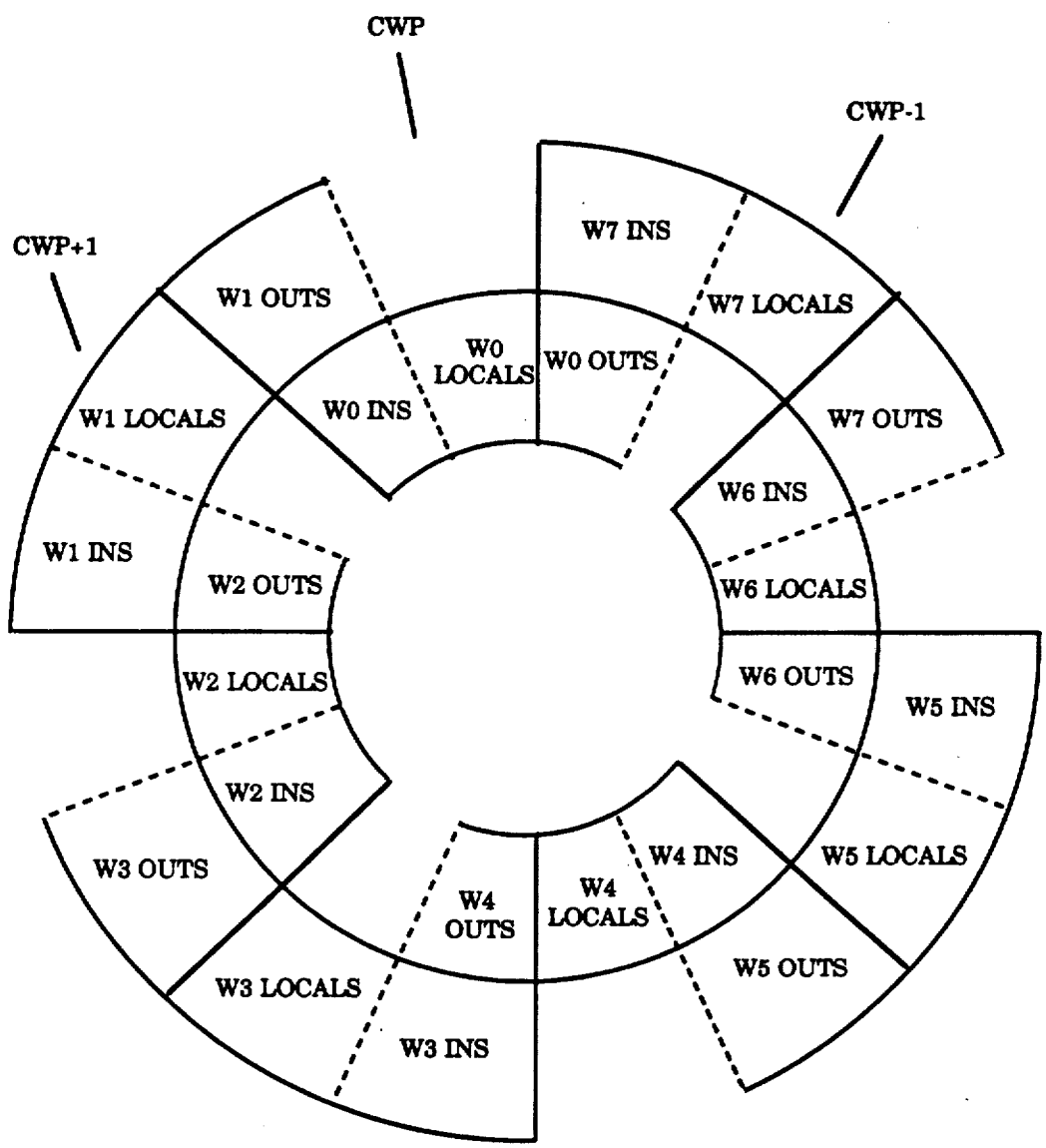
FIG. 2 is a diagram illustrating an array of register windows in the SPARC architecture.

FIG. 2 illustrates a small complete set of eight register windows in a SPARC architecture arrangement. It will be noted that the arrangement resembles an infinite set of register windows since each register window is associated with its immediately preceding and succeeding register windows. A current window pointer CWP held in the status/control registers designates the register window presently carrying out an operation. The register window designated by the pointer CWP+1 is the register window just preceding the current register window, the OUT registers of which are the IN registers of the current register window. The register window designated by the pointer CWP−1 is the register window just succeeding the current register window, the IN registers of which are the OUT registers of the current register window.

Figure 3:
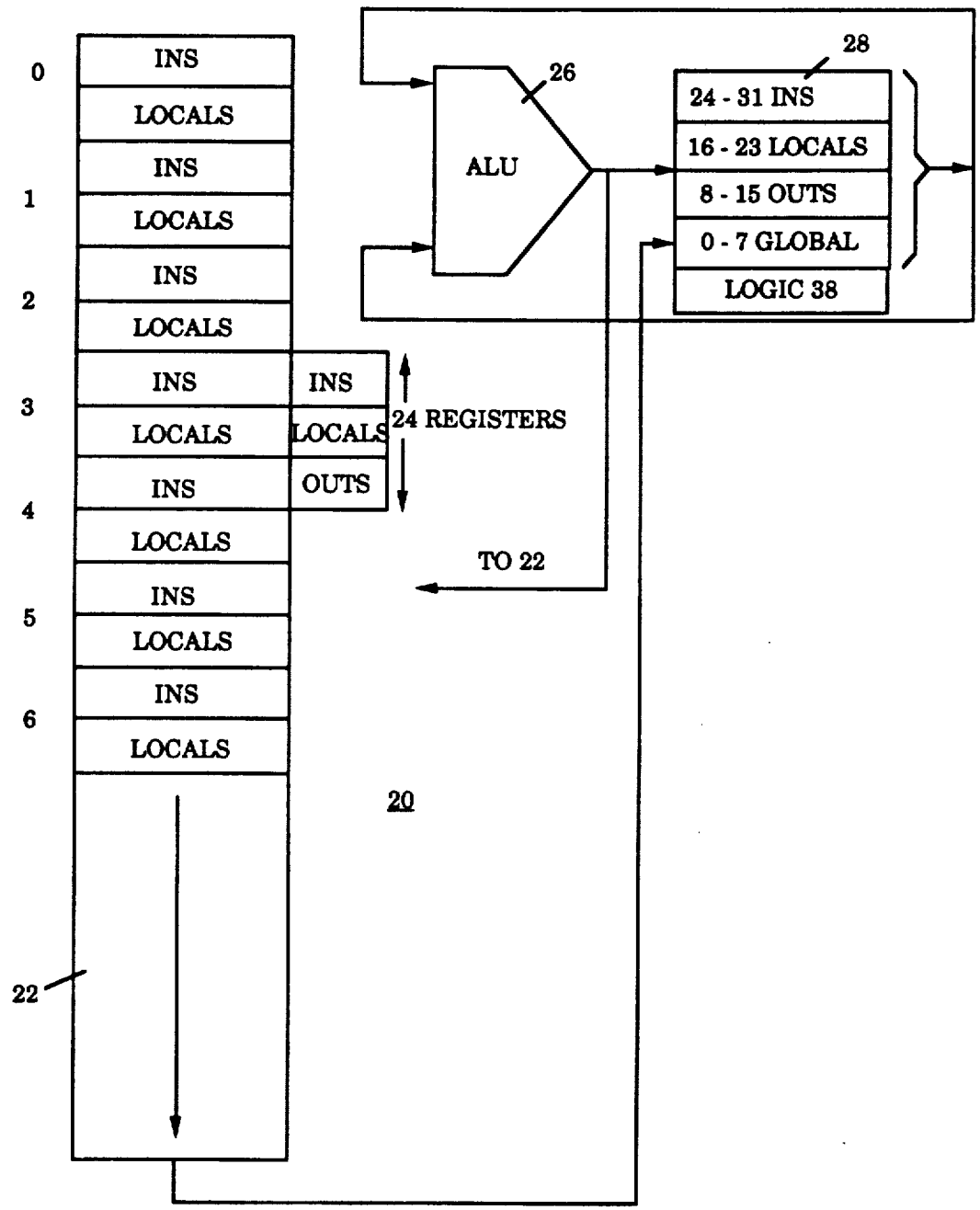
FIG. 3 is a block diagram illustrating a current window cache constructed in accordance with the invention.

FIG. 3 illustrates a processor constructed in accordance with the invention to carry out the SPARC architecture. The processor 20 illustrated in FIG. 3 includes a backing storage area 22 which in a preferred embodiment may be constructed of random access memory. In the preferred embodiment of the invention, the storage area 22 is divided into thirty-two windows each including sixteen 32-bit registers, eight IN registers and eight local registers. As in other examples of the SPARC architecture, the IN registers of each window are addressed as the OUT registers of the immediately preceding window. Thus, the IN registers illustrated for window 2 are also the OUT registers for window 1 immediately above; and the IN registers illustrated for window 3 are also the OUT registers for window 2 immediately above. This is illustrated in the dotted area to the right of window 3 in the figure.

In the preferred embodiment of the invention, the storage area 22 may be addressed in twenty-four register increments along with a set of global registers to form a register window. In the preferred embodiment of the invention, the storage area 22 may be constructed of relatively fast access random access memory. The register windows of the storage area 22 are associated with an arithmetic and logic unit 26 which may access the register windows of the storage area 22 in order to carry out the functions of a processor.

However, in order to make much more rapid the operation of the processor 20, a unique arrangement including a current window cache 28 has been devised. The current window cache 28 may be constructed of very fast random access memory and contain a number of lines sufficient to provide storage for the registers of one register window in the SPARC architecture. Thus, in the preferred embodiment, the current window cache 28 includes thirty-two lines of storage so that it may store information in eight IN registers, eight local registers, eight OUT registers, and eight global registers. As outlined above, each of these registers is capable of storing thirty-two bits of information.

The arrangement illustrated in FIG. 3 for the registers may be termed for the purpose of this explanation the standard register arrangement in the current cache window 28. As may be seen, the global registers are designated and addressed as registers 0 through 7, the OUT registers as registers 8 through 15, the local registers as registers 16 through 23, and the IN registers as registers 24 through 31. These register designations within the current window cache 28 may be considered to function as offsets into the cache from the base address designated by the current window pointer (CWP) which selects the operative register window.

The current window cache 28 functions as do other caches. When information in the memory storage area 22 is addressed for use, a copy of that information is stored in the cache 28. Upon a next access of the addressed information, the cache 28 is consulted first and if the information is contained therein it is utilized without the necessity of addressing the slower operating memory of storage area 22. Consequently, cache memory speeds may be attained for a great percentage of the operation.

In order to retain the advantage offered by the SPARC architecture, the cache 28 is arranged in an unusual manner, however. The cache 28 is provided with logic 38 so that addresses within the cache are changed with the change between register windows so that the cache lines holding the OUT registers of a first register window become the cache lines holding the IN registers of the succeeding register window on what would be a save operation, and the lines holding the IN registers of a first register window become the lines holding the OUT registers of the preceding register window on what would be a restore operation. By providing logic 38 in the cache 28 to accomplish this function, the information already held in the OUT registers becomes the information for the next register window IN registers on a save operation while the information already held in the IN registers becomes the information for the OUT registers of the preceding register window in a restore operation. Moreover, since the information in the global registers remains constant from window to window, only the information in the local register cache lines and either the IN or OUT register cache lines (depending on the direction of operation) needs to be changed.

To enhance the speed of operation of the current window cache 28, upon a restore operation in which the current window switches to the next preceding window, the valid bit is cleared before the switch for each register in lines of the cache 28 holding the local registers and the OUT register. In a similar manner, upon a save operation in which the current window switches to the next succeeding window, the valid bit is cleared before the switch for each register in lines of the cache 28 holding the local registers and the IN registers. In this way the cache lines holding information invalid for the new window are automatically marked as invalid without any addressing or testing so that they may be filled by the appropriate lines from the new window accessed in the storage area 22.

Figure 4:
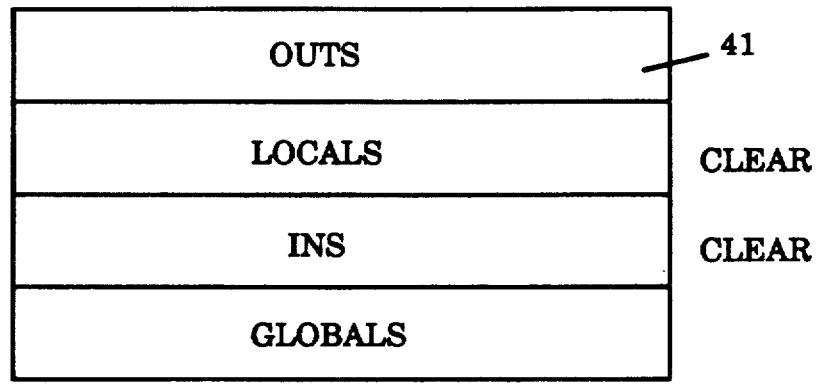
FIG. 4 is a diagram illustrating the arrangement of registers within three logically-associated register windows in operations utilizing the invention.
Figure 4:
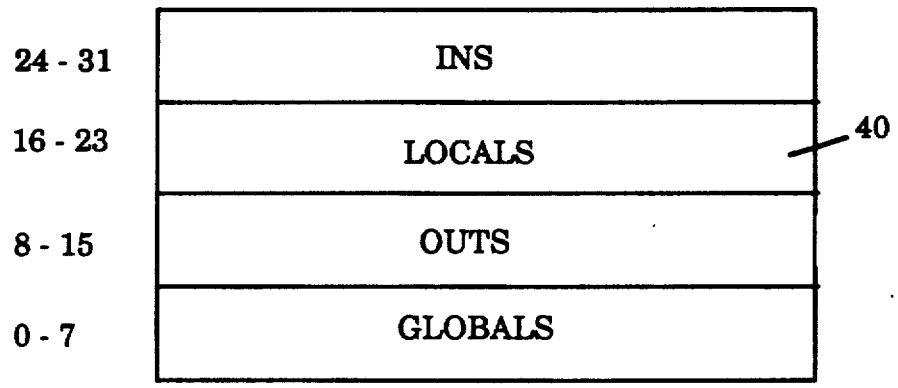
Figure 4:
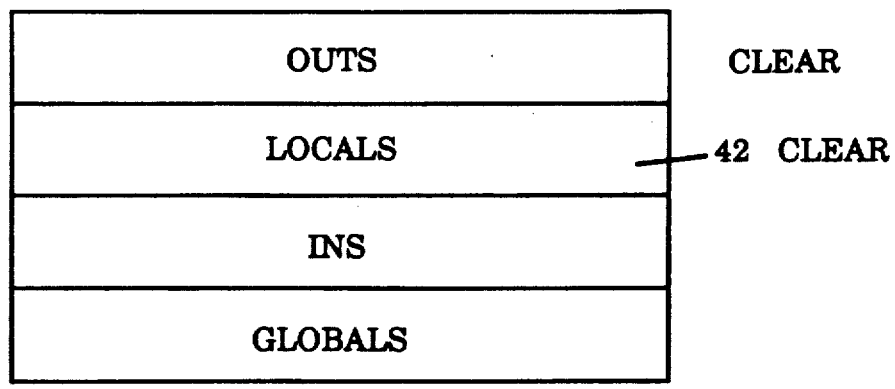

FIG. 4 illustrates three different arrangements of the cache 28. The center arrangement 40 is the current window, the upper arrangement 41 illustrates the preceding window which will occupy the cache 28 when a restore operation takes place, and the lower arrangement 42 illustrates the succeeding window which will occupy the cache 28 when a store takes place. As may be seen, the cache line addresses utilized in the center arrangement 40 are those shown in FIG. 3. When the processor completes its operation in the arrangement 40 and moves to the arrangement 42, a save occurs, the OUT registers of the window shown in arrangement 40 become the IN registers of the window shown in arrangement 42. Thus the addresses 8-15 designating the OUT registers of the window in arrangement 40 are changed to the addresses 24-31 designating the IN registers of the window shown in arrangement 42. In addition, the addresses 24-31 for the IN registers of the arrangement 40 are changed to the addresses 8-15 designating IN registers of the window shown in arrangement 42. At the same time, the valid bit is cleared at the addresses designating the new OUT and local registers.

As may be seen, this change of addresses allows the information in the global and OUT registers of the arrangement 40 to remain in the cache 28 and be used as the global and IN registers of the arrangement 42. It also allows the other lines to be filled with the appropriate information from the succeeding window.

In a similar manner, when the processor completes its operation in the register window illustrated in arrangement 40 and moves to the window of arrangement 41, a restore occurs, the IN registers of the window shown in arrangement 40 become the OUT registers of the window shown in arrangement 41. Thus the addresses 24-31 for the IN registers of the arrangement 40 are changed to the addresses 8-15 designating OUT registers of the window shown in arrangement 41. In addition, the addresses 8-15 for the OUT registers are changed to the addresses 24-31 designating IN registers of the window shown in arrangement 41, and the valid bit is cleared at the addresses designating the new IN and local registers.

As may be seen, this change of addresses allows the information in the global and IN registers of the register window illustrated in arrangement 40 to remain in the cache 28 and be used as the global and OUT registers of the arrangement 41. It also allows the other lines to be filled with the appropriate information from the succeeding window.

Referring again to FIG. 3, the logic 38 to carry out the invention may be set out as follows:

If PRA [4 . . . 0] describes the five bits of the physical address,

Then PRA [3 . . . 0] = VRA [3 . . . 0]

(That is, the four lowest bits do not change in addressing any register),

But PRA [4] = ((^VRA [3] AND VRA [4])

(That is, if the VRA [3] is zero as with globals and locals, then the PRA [4] = the VRA [4])

OR ((VRA [3] AND ((even AND VRA [4])

(That is, if the VRA [3] is one as with IN and OUT registers, then the PRA [4] = VRA [4] for even windows)

OR ^ even AND ^VRA [4])))

(That is, if the VRA [3] is one as with IN and OUT registers, then the PRA [4] = ^VRA [4] for odd windows).

This logic provides for the changes of addresses necessary to take advantage of the already stored information in the cache 28 upon either a save or a restore operation and for the invalidation of the information in the other lines of the cache 28. As may be seen, the register address within a register window requires five bits since there are thirty-two registers, and only five bits are necessary to designate thirty-two different offset values within a particular window. In fact, the addresses of only registers 8 through 15 and 24 through 31 need to be changed. FIG. 5 illustrates the values of bits for designating these register addresses in binary code. It will be clear that the binary addresses of registers 8 through 15 differ from those of the binary addresses of registers 24 through 31 only in the high order bit. Consequently, by switching the high order bit of the address for each of these registers upon either a store or restore, the addresses will be changed as outlined above.

Thus, only the high order bit needs to be changed in any change of address to accomplish the switch from OUT register to IN register and vice versa. For example, in switching from window 40 of FIG. 4 to window 41 on a restore operation, the line containing the IN register 24 becomes the line containing the OUT register 8. This may be accomplished by simply changing the high order bit from a one to a zero.

More generally, the address furnished in an instruction (which is for the purpose of this explanation called the virtual register address) needs to be changed to the physical register address, the address actually used in the cache to hold the information. For the purpose of this explanation, every other register window set in either direction beginning with the current register window set is considered to be an even numbered register window set, and the starting register window set is also considered to an even numbered set. When in the current register window and addressing other even numbered register windows, the physical register address equals the virtual register address. This should be clear because all of the registers in alternate register windows reside in identical positions.

Moreover, for odd numbered windows in which the registers addressed are local registers or global registers, the physical register address equals the virtual register address. This is clear since the global registers and the local registers remain in the same positions in the cache no matter what register window set is involved. However, where the virtual register address is directed to the IN registers of an odd numbered window, the physical register address is equal to the virtual register address minus sixteen. FIG. 5 illustrates that this is true. The difference in the addresses of the IN and OUT registers is only in the high order bit. Consequently, a virtual register address addressed to any of registers 24-31 may be addressed to physical registers 8-15 by switching the high order bit to a zero (subtracting sixteen from the address). In a similar manner, where the virtual register address is directed to the OUT registers of an odd numbered window, the physical register address is equal to the virtual register address plus sixteen. FIG. 5 illustrates that the difference in the addresses of the IN and OUT registers is only in the high order bit so that a virtual register address addressed to any of registers 8-15 may be addressed to physical registers 24-31 by switching the high order bit to a one (adding sixteen to the address).

The only other requirement is that the local registers of a register window set and the IN or OUT registers (whichever does not contain information being transferred) of such a set be invalidated upon a save or restore operation so that the values in those registers become unusable. When a save operation is performed, the local and OUT registers of the new window are invalidated. When a restore operation is performed, the local and IN registers of the new window are invalidated. This may be easily accomplished by clearing the valid bit for the information stored in the particular set of registers.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A processor that executes a plurality of procedures wherein at least one of the procedures calls another of the procedures, said processor coupled to a plurality of windowing apparatae comprising a plurality of window registers, each windowing apparatus of said windowing apparatae having a current window corresponding to an executing procedure, a previous window corresponding to a procedure which called the executing procedure and a next window corresponding to a procedure which is called by the executing procedure, each window having at least one IN register containing at least one parameter passed to the corresponding procedure by a calling procedure, at least one OUT register containing at least one parameter passed from the corresponding procedure to a called procedure and at least one LOCAL register, wherein the IN register of a particular window is the OUT register of a logically succeeding window, the processor comprising:

an arithmetic and logic unit (ALU):

a windowed register cache, coupled between the windowing apparatae and the ALU, said cache comprising a first register, a second register and a third register, the contents of the current window contained in the cache such that the first register contains contents of the current window IN register, the second register contains contents of the current window LOCAL register, the third register contains contents of the current window OUT register, the first, second and third registers are accessed by the ALU as containing the contents of the respective current window IN, LOCAL and OUT registers;

said windowed register cache further comprising logic means for controlling loading of, and access to, said windowed register cache such that if the procedure corresponding to the current window calls the procedure corresponding to the next window, the first register is loaded with contents of the next window OUT register, the second register is loaded with contents of the next window LOCAL register, and the third, second and first registers are accessed by the ALU as containing the contents of the respective next window IN, LOCAL and OUT registers;

if the procedure corresponding to the current window returns to the procedure corresponding to the previous window, the third register is loaded with the contents of the previous window IN register, the second register is loaded with the contents of the previous window LOCAL register, and the third, second and first registers are accessed by the ALU as containing the contents of the respective previous window IN, LOCAL and OUT registers;

whereby the windowed registers are cached for quick access by the ALU and the amount of data transferred from the windowed registers to the cache is minimized for rapid update of the cache.

2. The processor as set forth in claim 1, wherein the procedure corresponding to the current window calls the procedure corresponding to the next window during a SAVE operation.

the procedure corresponding to the current window returns to the procedure corresponding to the previous window during a RESTORE operation, the first and third registers have a first and second address such that the first register is addressed using the first address when the third register is addressed using the second address and the third register is addressed using the first address when the first register is addressed using the second address, and the address of the first register is changed by the logic means from the first address to the second address and the address of the third register is changed by the logic means from the second address to the first address during the SAVE and RESTORE operations.

3. The processor as set forth in claim 2, wherein the contents of the first and second registers are designated invalid by the logic means immediately prior to the SAVE operation and the contents of the second and third registers are designated invalid by the logic means immediately prior to the RESTORE operation thereby signifying the registers to be loaded during the SAVE and RESTORE operations.

4. The processor as set forth in claim 1, wherein each of the window IN, LOCAL and OUT registers and each of the first, second and third registers comprise a plurality of registers.

5. The processor as set forth in claim 1, wherein the IN register of each of said windows contains an output parameter of the logically preceding window and the OUT register of said each of said windows contains an input parameter of the logically succeeding register.

6. A processor that executes a plurality of procedures wherein at least one of the procedures calls another of the procedures, said processor coupled to a plurality of windowing apparatae comprising a plurality of window registers, each windowing apparatus of said windowing apparatae having a current window corresponding to an executing procedure, a previous window corresponding to a procedure which called the executing procedure and a next window corresponding to a procedure which is called by the executing procedure, each window having at least one IN register containing at least one parameter passed to the corresponding procedure by a calling procedure, at least one OUT register containing at least one parameter passed from the corresponding procedure to a called procedure and at least one LOCAL register, wherein the IN register of a particular window is the OUT register of a logically succeeding window, the processor comprising:

an arithmetic and logic unit (ALU);

a windowed register cache, coupled between the windowing apparatae and the ALU, said cache comprising a first register, a second register and a third register, each of the first, second and third registers having at least one identifying address, the first and third registers having a first and second address such that the first register is addressed using the first address when the third register is addressed using the second address and the third register is addressed using the first address when the first register is addressed using the second address, the contents of the current window contained in the cache such that the first register contains contents of the current window IN register and is addressed using the first address, the second register contains contents of the current window LOCAL register, the third register contains contents of the current window OUT register and is addressed using the second address, the first, second and third registers accessed by the ALU as containing the contents of the respective current window IN, LOCAL and OUT registers;

said windowed register cache further comprising logic means for controlling loading of, and access to, said windowed register cache such that if the procedure corresponding to the current window calls the procedure corresponding to the next window, the first register is loaded with contents of the next window OUT register, the second register is loaded with contents of the next window LOCAL register, the address of the first register is changed to the second address and the address of the third register is changed to the first address, and the third, second and first registers are accessed by the ALU as containing the contents of the respective next window IN, LOCAL and OUT registers;

if the procedure corresponding to the current window returns to the procedure corresponding to the previous window, the third register is loaded with the contents of the previous window IN register, the second register is loaded with the contents of the previous window LOCAL register, the address of the first register is changed to the second address and the address of the third register is changed to the first address, and the first, second and third registers are accessed by the ALU as containing the contents of the respective previous window IN, LOCAL and OUT registers;

whereby the windowed registers are cached for quick access by the ALU and the amount of data transferred from the windowed registers to the cache is minimized for rapid update of the cache.

7. The processor as set forth in claim 6, wherein the procedure corresponding to the current window calls the procedure corresponding to the next window during a SAVE operation, the procedure corresponding to the current window returns to the procedure corresponding to the previous window during a RESTORE operation, the contents of the first and second registers are designated invalid by the logic means immediately prior to the SAVE operation and the contents of the second and third registers are designated invalid by the logic means immediately prior to the RESTORE operation thereby signifying the registers to be loaded during the SAVE and RESTORE operations.

8. The processor as set forth in claim 6, wherein each of the window IN, LOCAL and OUT registers and each of the first, second and third registers comprise a plurality of registers.

9. The processor as set forth in claim 6, wherein the IN register of each of said windows contains an output parameter of the logically preceding window and the OUT register of said each of said windows contains an input parameter of the logically succeeding register.

10. In a processor comprising an arithmetic and logic unit (ALU) said processor executing a plurality of procedures wherein at least one of the procedures calls another of the procedures, the processor coupled to a plurality of windowing apparatae, each windowing apparatus of said windowing apparatae having a current window corresponding to an executing procedure, a previous window corresponding to a procedure which called the executing procedure, and a next window corresponding to a procedure which is called by the executing procedure, each window having at least one IN register containing at least one parameter passed to the corresponding procedure by a calling procedure, at least one OUT register containing at least one parameter passed from the corresponding procedure to a called procedure and at least one LOCAL register, wherein the IN register of a particular window is the OUT register of a logically succeeding window, a method for caching the windows to increase the speed of access to the windows, said method comprising the steps of:
  providing a windowed register cache, coupled between the windows and the ALU, the cache comprising a first register, a second register and a third register;
  loading contents of the current window into the cache such that the first register contains contents of the current window IN register, the second register contains contents of the current window LOCAL register and the third register contains contents of the current window OUT register;
  if the procedure corresponding to the current window calls the procedure corresponding to the next window, loading the first register with contents of the next window OUT register, the second register with contents of the next window LOCAL register;
  if the procedure corresponding to the current window returns to the procedure corresponding to the previous window, loading the third register with the contents of the previous window IN register, loading the second register with the contents of the previous window LOCAL register;
  whereby the ALU accesses the windowed register cache for quick access and the windowed register cache is rapidly updated by loading the minimum amount of data from the windowed registers.

11. The caching method as set forth in claim 10, wherein the procedure corresponding to the current window calls the procedure corresponding to the next window during a SAVE operation.

12. The caching method as set forth in claim 11, wherein the procedure corresponding to the current window returns to the procedure corresponding to the previous window during a RESTORE operation.

13. The caching method as set forth in claim 10, wherein the first and third registers have a first and second address such that the first register is addressed using the first address when the third register is addressed using the second address and the third register is addressed using the first address when the first register is addressed using the second address, wherein:
  said step of loading the first register with contents of the next window OUT register if the procedure corresponding to the current window calls the procedure corresponding to the next window further comprises changing the address of the first register from the first address to the second address and the address of the third register from the second address to the first address; and
  said step of loading the first register with contents of the previous window IN register if the procedure corresponding to the current window returns to the procedure corresponding to the previous window further comprises changing the address of the first register from the first address to the second address and the address of the third register from the second address to the first address.

14. The caching method as set forth in claim 12, further comprising the step of designating the contents of the first and second registers invalid immediately prior to the SAVE operation and designating the contents of the second and third registers invalid immediately prior to the RESTORE operation thereby signifying the registers to be loaded during the SAVE and RESTORE operations.

* * * * *